United States Patent
Bassman et al.

(10) Patent No.: US 6,295,567 B1
(45) Date of Patent: Sep. 25, 2001

(54) CHASSIS TYPE DETERMINATION IN AN ELECTRONIC SYSTEM

(75) Inventors: Robert G. Bassman; Kevin L. Miller, both of Austin, TX (US)

(73) Assignee: Dell USA, L.P., Round Rock, TX (US)

( * ) Notice: Subject to any disclaimer, the term of this patent is extended or adjusted under 35 U.S.C. 154(b) by 0 days.

(21) Appl. No.: 09/013,450

(22) Filed: Jan. 26, 1998

(51) Int. Cl.$^7$ ............... G06F 13/00; H05K 5/00
(52) U.S. Cl. ............ 710/104; 361/796; 361/752; 361/753
(58) Field of Search .............. 710/104, 100, 710/101, 102, 103; 713/1, 2, 100; 361/600, 601, 719, 720, 722, 724, 730, 796, 752, 753

(56) References Cited

U.S. PATENT DOCUMENTS

| | | | |
|---|---|---|---|
| 5,162,675 | 11/1992 | Olsen et al. | 326/37 |
| 5,218,760 | 6/1993 | Colton et al. | 29/845 |
| 5,310,998 * | 5/1994 | Okumo | 235/380 |
| 5,451,167 * | 9/1995 | Zielinski et al. | 439/92 |
| 5,455,927 * | 10/1995 | Huang | 710/129 |
| 5,501,608 | 3/1996 | Scheer et al. | 439/218 |
| 5,506,490 * | 4/1996 | DeMuro | 320/106 |
| 5,612,634 | 3/1997 | MacKenna | 326/62 |
| 5,636,347 | 6/1997 | Muchnick et al. | 710/103 |
| 5,647,748 * | 7/1997 | Mills et al. | 439/81 |
| 5,684,796 * | 11/1997 | Abidi et al. | 370/389 |
| 5,841,287 * | 11/1998 | Duley | 324/537 |
| 5,862,351 * | 1/1999 | He | 395/284 |
| 5,865,518 * | 2/1999 | Jarrett et al. | 312/223.2 |
| 5,884,988 * | 3/1999 | Foo et al. | 312/223.2 |
| 5,894,232 * | 4/1999 | Duley | 327/48 |
| 5,974,474 * | 10/1999 | Furner et al. | 710/8 |
| 5,983,195 * | 11/1999 | Fierro | 705/10 |
| 6,061,505 * | 5/2000 | Pitchaikani et al. | 395/200.56 |

FOREIGN PATENT DOCUMENTS

| | | | |
|---|---|---|---|
| 0 562 295 A1 | 9/1993 | (EP) | 7/167 |
| 0 655 692 A2 | 5/1995 | (EP) | 13/38 |

* cited by examiner

*Primary Examiner*—Robert Beausoleil
*Assistant Examiner*—Tim Vo
(74) *Attorney, Agent, or Firm*—Skjerven Morrill MacPherson LLP; David G. Dolezal (57) ABSTRACT

A chassis detection circuit for detecting and determining the chassis type. The chassis detection circuit detects structural differences of the chassis to determine chassis type. The chassis detection circuit provides a signal indicative of whether an electrically conductive surface such as a flange surface on a grounding clip is electrically contacting a grounded structure of a chassis such as a hook structure of a planar plate to which a circuit board is secured. The chassis detection circuit can be implemented in a computer system where the determined chassis type is used in environmental monitoring programs or operations. Also, where the chassis type is indicative of the computer system type, the determined computer system type may be used for operations requiring computer system type identification.

36 Claims, 4 Drawing Sheets

CHASSIS TYPE DETERMINATION IN AN ELECTRONIC SYSTEM

BACKGROUND OF THE INVENTION

1. Field of the Invention

The invention relates to a chassis for electronic devices and more specifically to a system for determining the chassis type.

2. Description of the Related Art

Computer systems are information handling systems which can be designed to give independent computing power to one user or a plurality of users. Computer systems may be found in many forms including, for example, mainframes, minicomputers, workstations, servers, personal computers, internet terminals, notebooks, and embedded systems. Personal computer (PC) systems, such as the International Business Machines (IBM) compatible PC systems, include desktop, floor standing, or portable versions. A typical PC system is a microcomputer that includes a system processor, associated memory and control logic, and a number of peripheral devices that provide input and output for the system. Such peripheral devices often include display monitors, keyboards, mouse-type input devices, floppy and hard disk drives, CD-ROM drives, and printers. The number of devices being added to personal computer systems continues to grow. For example, many computer systems also include network capability, terminal devices, modems, televisions, sound devices, voice recognition devices, electronic pen devices, and mass storage devices such as tape drives, CD-R drives, and DVDs.

One reason for in the increase in popularity of computer systems is the relative decrease in price of a computer system versus the amount of computing power provided. One way to decrease the manufacturing cost of a computer system is to assemble different types of computer systems from standardized computer system component modules. For example, two different types of computer systems such as two different models of computer system servers may each include a "standardized" system circuit board which includes a standard system processor and a standard memory or memories. To further reduce manufacturing costs, the memories of the various types of computer systems may be loaded with the same programs, firmware, and BIOS code. Thus, the standard system circuit board for the various types of computer systems can be made by a single manufacturing process.

One problem with the modular approach to computer system manufacture is how the operating system and/or chassis environmental control systems determines the type of chassis and/or computer system in which the standardized system board has been installed. A manually set jumper or switch may be used to indicate the computer system type. However, these jumpers may not be set properly during manufacture or may become dislodged during the manufacture or shipping of the computer system. What is needed is a more efficient system for determining the chassis type of the computer system and for providing an indication of the operating system and/or environmental control systems.

SUMMARY OF THE INVENTION

It has been discovered that a chassis detection circuit that provides a signal indicative of the presence of a chassis structure which is indicative of chassis type advantageously enables a standardized system board to be utilized in a variety of chassis types.

In one aspect of the invention, an apparatus for determining chassis type includes a first surface and a chassis detection circuit providing a type signal indicative of the presence of a structure of the chassis contacting the first surface. The presence of the structure is indicative of chassis type.

In another aspect of the invention, a computer system includes a circuit board, a system processor, and a chassis. The chassis is of a chassis type. The circuit board and the system processor are located within the chassis. The computer system also includes a chassis detection circuit providing a type signal indicative of the presence of a structure of the chassis.

In another aspect of the invention, a method for determining the chassis type of an electronic device includes detecting the presence of a structure of a chassis for an electronic device. The presence of a structure of the chassis is indicative of the chassis type. The method also includes providing a type signal indicative of the presence of the structure.

In another aspect of the invention, a computer system includes a circuit board, a system processor, and a chassis. The chassis is of a chassis type. The circuit board and the system processor are located within the chassis. The computer system also includes an electrically conductive surface physically coupled to the circuit board and a chassis detection circuit including a pull up resistor having a first end electrically coupled to the electrically conductive surface. The chassis detection circuit provides a type signal dependent upon the voltage level of the first end of the pull up resistor. The type signal is indicative of the presence of a grounded structure of the chassis electrically contacting the electrically conductive surface. The presence of the structure is indicative of the chassis type.

In another aspect of the invention, a computer system includes a circuit board, a system processor, and a chassis. The circuit board and system processor are located within the chassis. The computer system also includes means for detecting structural differences of the chassis and providing a signal indicative thereof.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DETAILED DESCRIPTION

The following sets forth a detailed description of the best contemplated mode for carrying out the invention. The description is intended to be illustrative of the invention and should not be taken to be limiting.

Figure 1:
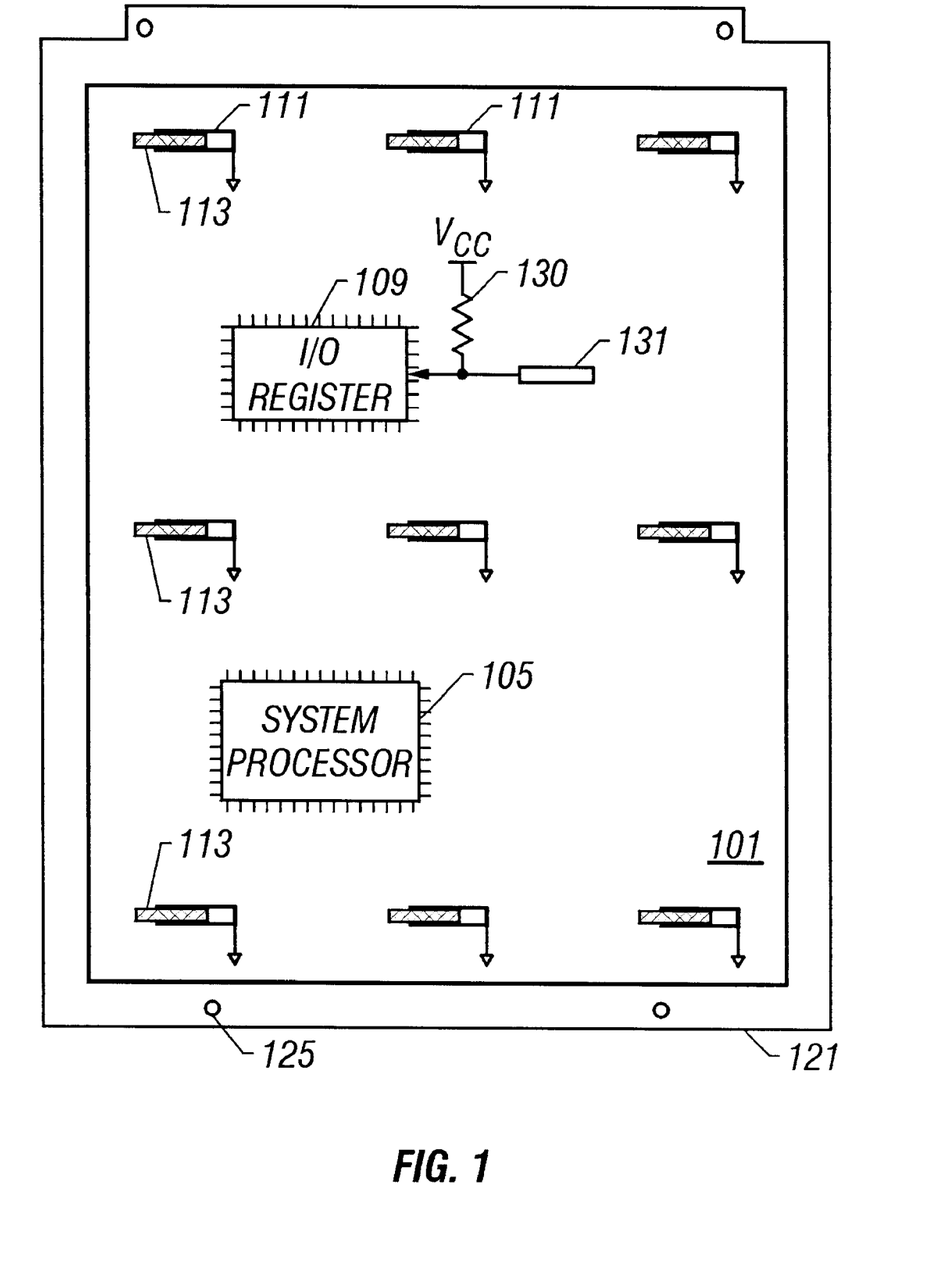
FIG. 1 is a top view of one embodiment of a computer system circuit board according to the present invention.

FIG. 1 shows a top view of a circuit board secured to a planar plate of a chassis. Circuit board 101 is a printed circuit board that is the system board, motherboard, or system circuit board for a computer system. Mounted to circuit board 101 are the system processor 105 and an I/O register 109. In one embodiment, the system processor 105 is an X86 compatible processor such as a processor sold under the trade designation of PENTIUM II by the INTEL CORPORATION.

Circuit board 101 includes a plurality of grounding clips 111 which are electrically connected to a grounding conductor or grounding plane embedded in circuit board 101 as symbolically shown by the system ground connections. Each grounding clip 111 has an outer surface that electrically contacts a corresponding structure 113 of the planar plate 121 which extends upward through a slot in the circuit board. In the embodiment shown, the structure 113 is a hook that is integrally connected to the planar plate. The outer surface of the grounding clip 111 electrically contacting hook 113 of planar plate 121 electrically couples the embedded ground plane of circuit board 101 to the planar plate. An example of a circuit board ground plane electrically coupled to a chassis hook structure via a ground clip is found in Mills et al., U.S. Pat. No. 5,647,748, entitled "Printed Circuit Board Ground Clip", which is hereby incorporated by reference in its entirety.

Planar Plate 121 is a structure of the chassis that is designed to physically secure the system circuit board 101 in a computer system chassis. The planar plate includes screw holes or rivet holes 125 for physically attaching and electrically grounding the planar plate to the remaining portion of the chassis. In some embodiments, a jumper also electrically couples the planar plate to the remaining portion of the chassis.

Securing the system circuit board to a planar plate of a chassis enables a computer system manufacturer to implement a modular approach to computer system design. With such a design feature, a computer system manufacturer can install a standardized system circuit board in a variety of chassis types and consequently a variety of computer system types. The planar plate for each chassis type has differences in structure which correspond to the differences in structure of the chassis types. By detecting structural differences among the various planar plate types and providing a signal indicative of the differences, the present invention provides a system for allowing a computer system implementing a standardized system circuit board with standardized computer components and computer code to determine the chassis type and/or computer system type and execute operations accordingly.

In the embodiment shown in FIG. 1, the computer system implementing circuit board 101 includes a chassis detection circuit for detecting the type of planar plate to which the circuit board is secured and for providing a signal indicative thereof. Mounted to circuit board 101 is a grounding clip 131 which is similar to grounding clips 111 except that grounding clip 131 is not electrically coupled to the embedded circuit board ground plane (not shown in FIG. 1). Grounding clip 131 is electrically connected to one end of pull up resistor 130 which is symbolically shown in FIG. 1. The other end of pull up resistor 130 is connected to the circuit board VCC, which in one embodiment is at +5 VDC. The chassis detection circuit also includes an I/O register circuit 109 having an input terminal electrically connected to ground clip 131 and to one end of resister 130. I/O register 109 also includes an output (not shown in FIG. 1) wherein the state of the output is indicative of the presence of a grounding hook of the planar plate electrically contacting grounding clip 131. It is understood that the state of an output indicating the presence of a structure or a signal indicating the presence of a structure inferentially indicates the absence of the structure as well.

Circuit board 101 may be secured or attached to at least two types of planar plates with each planar plate type capable of being mounted and attached to at least one different chassis type. In the embodiment shown, planar plate 121 is of a first type wherein the planar plate does not include a hook structure similar to hook structures 113 at a location that corresponds to grounding clip 131 such that when the circuit board 101 is secured to planar plate 121, grounding clip 131 does not electrically contact a hook structure. Circuit board 101 may also be secured to a second type of planar plate (not shown) that does have an electrically conductive hook structure similar to hook 113 at a location that corresponds to clip 131 such that when the circuit board 10, is secured to the planar plate of the second type, the hook structure at the corresponding location engages and electrically contacts clip 131.

When the circuit board is secured to a planar plate of the first type (no corresponding hook) and the first type planar plate is attached and electrically grounded to the remaining portion of the chassis, the voltage level at the input of the I/O register is at approximately VCC since clip 131 is not in contact with any grounded structure of the chassis. When circuit board 101 is secured to a planar plate of the second type (with a corresponding electrically conductive hook), clip 131 is in electrical contact with a grounded chassis structure via the planar plate of the second type such that the voltage level of the input of the I/O register 109 (and the voltage level of the ground clip 131 and one end of pull up resistor 130) is pulled to approximately zero volts. Thus, the voltage level of ground clip 131, the input of the I/O register 109, and one end of the pull up resister 130 are indicative of an electrically conductive structure of the planar plate in electrical contact with the ground clip 131, and correspondingly the presence of an electrically conductive structure of planar plate 121.

Figure 2:
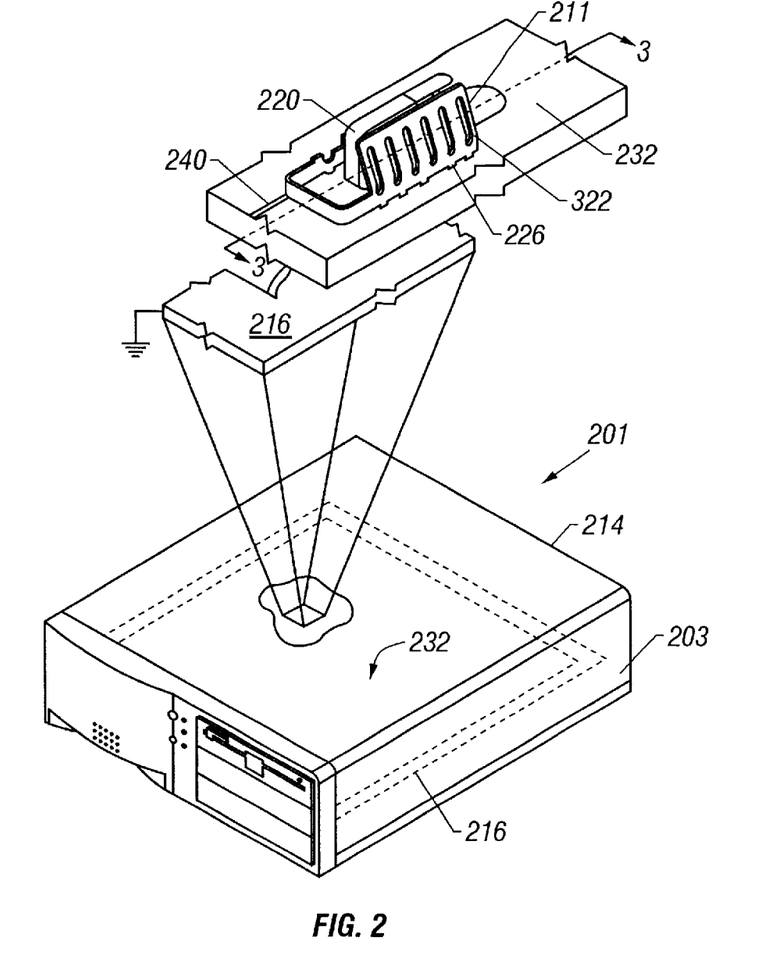
FIG. 2 is a perspective view of a computer system including an exploded isometric view of an electrically conductive surface in electrical contact with a structure of a chassis according to the present invention.

FIG. 2 is a perspective view of a computer system including an exploded isometric view of an electrically conductive surface in electrical contact with a grounded structure of a chassis according to the present invention. Computer system 201 includes a chassis 203 for housing circuit board 232. Chassis 203 includes a planar plate 216 with the circuit board 232 secured to the planar pate 216. Chassis 203 also includes a back plate 214. At least a portion of the chassis including the planar plate and the back plate 214 are made of an electrically conductive material. The portions of the chassis made of electrically conductive material are electrically coupled together. When computer system 201 is coupled to an AC power supply, the electrically conductive portions of chassis 203 are coupled to ground via the third wire grounding conductor of an AC power cord. In the embodiment shown, computer system 201 is a personal computer system having a desktop chassis type.

FIG. 2 shows an exploded isometric view of a clip 211 engaging and electrically contacting a hook 220 of planar plate 216. Hook 220 is integrally connected to the planar plate 216. In other embodiments, the hook may be formed separately and attached to the planar plate 216 with other attaching techniques such as rivets, screws, or spot welding.

Clip 211 is made of an electrically conductive material and includes legs 226 that are inserted into plated through holes or plated vias in the circuit board 232. The plated through holes are electrically connected to a conductor such as a surface trace conductor 240 which is electrically coupled to one end of a pull up resistor (similar to item 130) of the chassis detection circuit.

Figure 3:
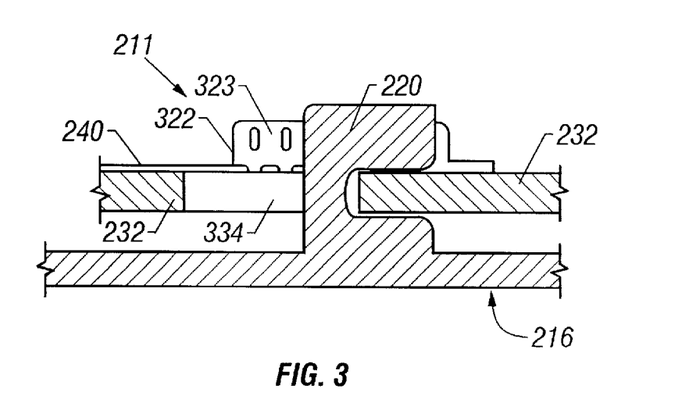
FIG. 3 is a partial cross-sectional view along plane 3—3 of FIG. 2.

FIG. 3 is a partial cross-sectional view along plane 3—3 of FIG. 2. Circuit board 232 includes a slot 334 for inserting hook 220 through the circuit board 232 when the circuit board is being secured to the planar plate 216 during the manufacture of the computer system 201. After the hook 220 is placed through slot 334, the circuit board is secured to the planar plate 216 by moving the circuit board 232 in a lateral direction.

Clip 211 includes two retainers 322 each including a flange surface 323 (only one of the retainers is shown in FIG. 3). The retainers 322 are inwardly biased towards each other so as to provide a force upon the surface of hook 220 by the flange surfaces 323 when the clip 211 is engaging hook 220. This inward force helps to insure a good electrical contact between the flange surfaces 323 and hook 220. Since the planar plate 216 is of a second type of planar plate that includes a hook structure 220 at a location corresponding to clip 211, flange surfaces 323 electrically contacting hook 220 pull the voltage level of the clip 211, and therefore the end of a pull up resistor electrically coupled to clip 211, to ground to indicate that the planar plate is of the second type. If the planar plate were of a first type, then the planar plate would not have a hook 220 at the location corresponding to the location of clip 211, and the voltage level of clip 211 would be at approximately the voltage level of VCC.

Figure 4:
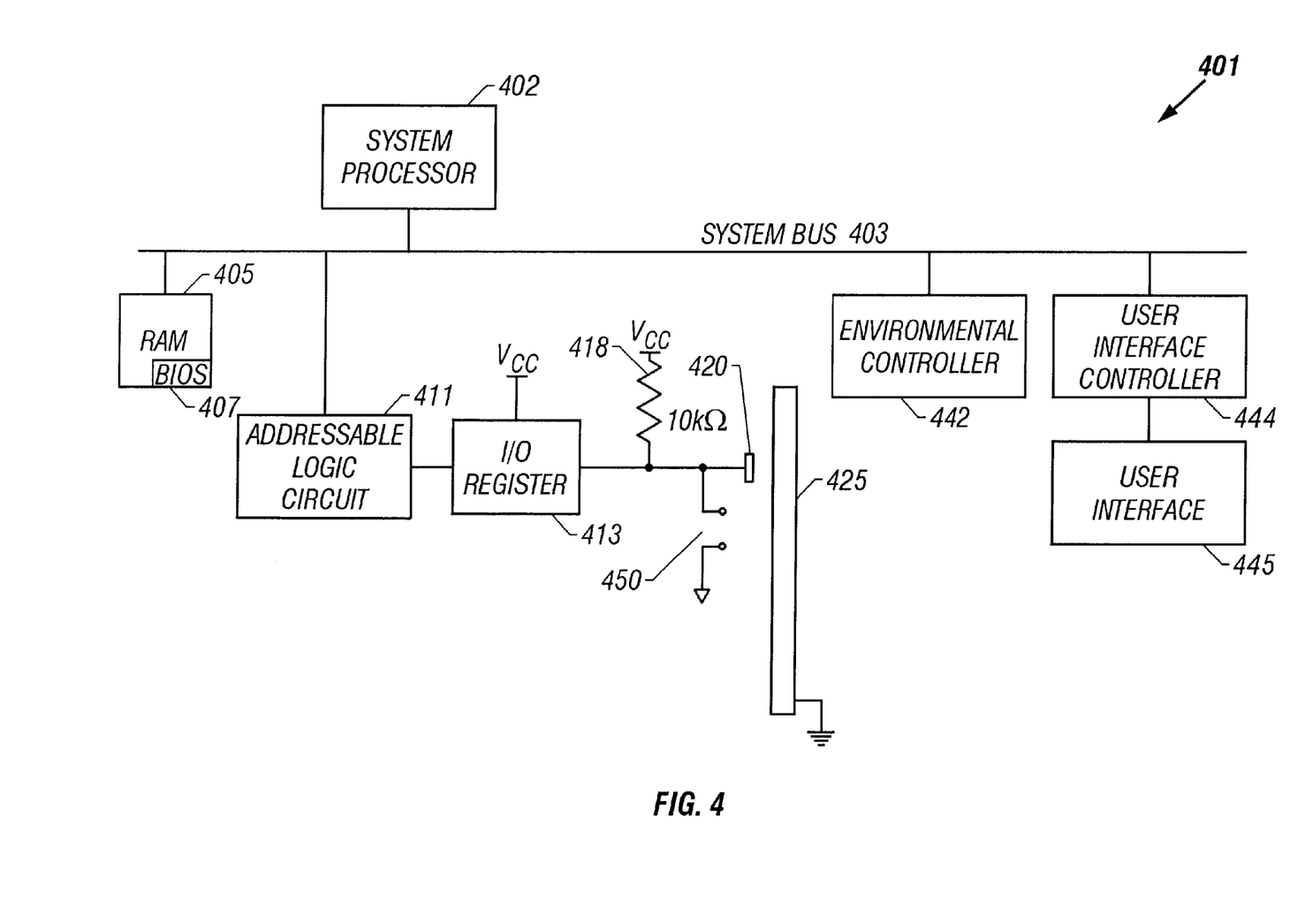
FIG. 4 is a diagram of one embodiment of a computer system including a chassis detection circuit according to the present invention.

FIG. 4 is a block diagram of one embodiment of a computer system that includes a chassis detection circuit according to the present invention. Computer system 401 includes a system printed circuit board similar to printed circuit board 101. Computer system includes a system processor 402 which in one embodiment is compatible with the X86 architecture. Computer system 401 also includes a RAM 405 which is capable of storing a Basic Input Output System (BIOS) code 407. In some embodiments, the BIOS code 407 is stored in a read only memory (ROM). Computer system 101 also includes an environmental controller 442 for controlling fans mounted in the computer system chassis and a user interface controller 444 which is operably coupled to a user interface 445 such as a monitor. In one embodiment, the environmental controller is a microcontroller offered under the trade designation of 8051 by INTEL CORPORATION.

Computer system 401 also includes an addressable logic circuit 411 which in one embodiment is a chip set offered under the trade designation of 82440BX by INTEL CORPORATION. The addressable logic circuit 411 includes memory mapped I/O that is addressable and readable by the system processor 402. The addressable logic circuit 411 has an input terminal for receiving a signal from an I/O register 413. I/O register 413 has an input terminal that is electrically connected to one end of a 10 K ohm pull up resistor 418 and to an electrically conductive surface 420. The I/O circuit stores the state of the voltage level of the electrically conductive surface 420 upon the powering up of the computer system. In other embodiments, an input terminal of the addressable logic circuit 411 is electrically connected to one end of the pull up resister 418 and to the electrically conductive surface 420; wherein the voltage level of the electrically conductive surface 420 is read via the input terminal.

In one embodiment, the electrically conductive surface 420 is a flange similar to flange 323. In other embodiments, the electrically conductive surface may be located on other types of structures or take other forms. For example, the electrically conductive surface may be a flat metallic plate or solder mound attached or mounted to the outer surface of the printed circuit board.

In one embodiment, the system processor 402, addressable logic circuit 411, I/O Register 413, pull up resistor 418 and electrically conductive surface 420 are all mounted on or attached to the system printed circuit board (not shown). The printed circuit board is secured to a planar plate 425 electrically coupled to the remaining portion of the chassis which is grounded via a grounding conductor (not shown).

In the embodiment shown, the chassis detection circuit includes a test jumper 450 for testing the operation of the chassis detection circuit during the manufacture of the computer system.

Figure 5:
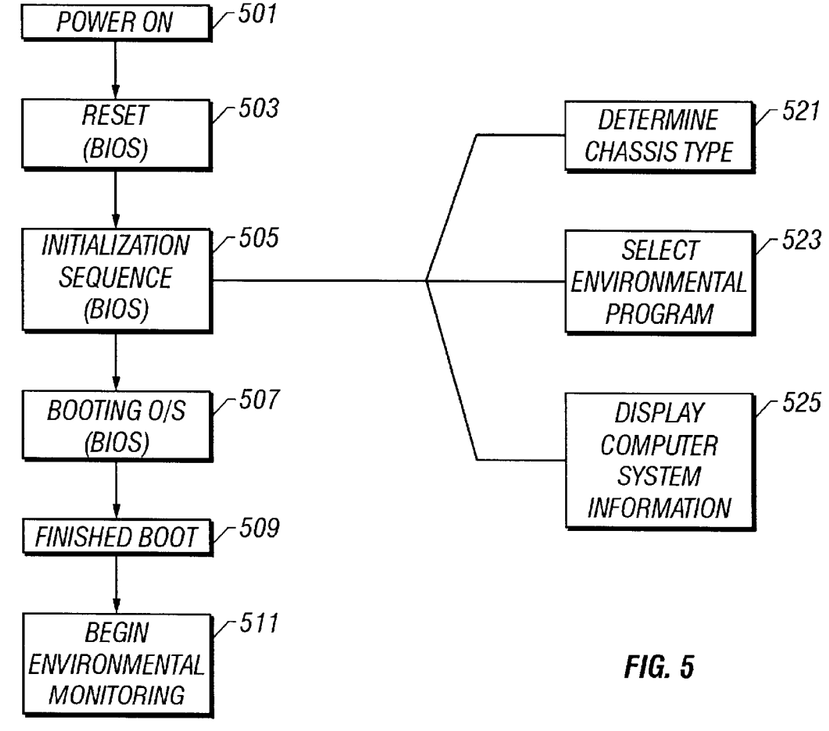
FIG. 5 is a flow chart of the startup of one embodiment of a computer system according to the present invention.

FIG. 5 is a flow chart of the start up of one embodiment of a computer system according to the present invention. More specifically, FIG. 5 shows the startup of the computer system of FIG. 4. In Step 501, computer system 401 is powered up. After powering up, the state of the voltage level of the electrically conductive surface 420 is stored in the I/O register 413. Because planar plate 425 does not have a grounded structure at a corresponding location to the electrically conductive surface 420, the voltage level of the electrically conductive surface 420, and therefore the voltage level of the input terminal of the I/O register 413, is at approximately VCC. Thus, the output of the I/O register 413 indicates that the planar plate 425 is of a type of planar plate that does not have a grounded structure at a corresponding location to electrically conductive surface 420.

In step 503, the system processor 402, executing BIOS 407, resets the components of the computer system 401. After step 503, the system processor 402, executing BIOS 407, begins an initialization sequence 505. Steps 521, 523, 525 are performed during the initialization sequence 505. In step 521, the system processor 402, executing the BIOS 407, determines the chassis type by reading a specific location of the addressable logic circuit 411 whose contents are indicative of the presence of a corresponding grounded structure of the planar plate 425 as determined by the output of I/O register 413.

After the chassis type has been determined, the system processor 402, executing BIOS 407, initiates a processor operation or operations based upon the information conveyed by the contents read from the addressable logic circuit 411. In step 523, the system processor 402 initiates the down-loading of a particular code or program from a plurality of environmental programs to an associated memory (which may be, for example, internal to controller 442) of the environmental controller 442 that enables the environmental controller 442, when executing the selected environmental program, to monitor and control the internal environmental conditions of the computer system chassis. Each of the plurality of environmental programs is designed for controlling the environmental conditions of a particular chassis type. For example, a first chassis type may include four chassis fans and a second chassis type may only include three chassis fans. The environmental program for the first chassis type enables the environmental controller 442 to independently control four fans whereas the environmental program for the second type enables the environmental controller 442 to independently control three fans. In other embodiments, the system processor may provide a signal to the environmental controller 442 indicating chassis type; wherein the environmental controller selects an environmental program from a plurality of environmental programs stored in its associated internal memory based upon the chassis type. In another embodiment, the environmental controller 442 utilizes the chassis type information in executing a single environmental program that is capable of controlling the environmental conditions for a plurality of chassis types. In this embodiment, the chassis type is an input variable to the single environmental program.

In one embodiment, in an Advanced Configuration and Power Interface (ACPI) compliant computer system, the operating system may monitor the thermal status of the computer system. In such a system, the operating system reads a table in memory, set up by the execution of a BIOS routine, to obtain information pertaining to thermal control. The system processor, executing the BIOS routine, sets up the table according to the chassis type as determined by the chassis detection circuit.

In step 525, the system processor 402, executing BIOS 407, initiates a display of text on user interface 445 that indicates the chassis type and/or computer system type. In one embodiment, after determining the chassis type from reading the addressable logic circuit 411, the system processor runs a BIOS routine to direct the user interface 444 via the user interface controller 444 to display the chassis type on the user interface 445 during the start up of the computer system. Since the presence of a corresponding grounded structure may also be indicative of the computer system type, the system processor may direct the user interface to display the computer system type on the user interface 445 during the startup of the computer system. For example, if a corresponding grounded structure is detected, then the system processor, executing BIOS 407, would determine that the computer system is of a first computer system type such as a computer system server offered under the trade designation of POWER EDGE 2300 by DELL USA L.P. and thus, the trade designation would be displayed on the user interface 445 during startup. However, if a corresponding grounded structure is not detected, then the system processor would determine that the computer system is of a second computer system type such as a computer system server offered under the trade designation of POWER EDGE 4300 by DELL USA L.P., and thus, that trade designation would be displayed on the user interface during startup.

In other embodiments, the system processor may execute other operations based upon the chassis type or computer system type as determined by the chassis detection circuit. In one embodiment, each PCI device in a computer system has a PCI configured register called a "subsystem ID" register. After determining the computer system type, the system processor, executing a BIOS routine, initializes the subsystem ID registers with a value indicating the computer system type as determined by the chassis detection circuit. In another embodiment, a specific type of circuit board may be used in both a stand alone PC and a Network PC. In the network PC, the printed circuit board would be secured to a first type of planar plate, and in the stand alone PC, the circuit board would be secured to a second type of planar plate. During startup, if the computer system is determined, via the chassis detection circuit, to be a Network PC, then the computer system would be booted up from a network server instead of being booted up from an internal hard disk drive as with a stand alone PC.

After the initialization sequence, the system processor 402, executing BIOS, in step 507 boots up the operating system. In one embodiment, the operating system is offered under the trade designation of WINDOWS NT by the MICROSOFT Corp. In step 509, the booting of the operating system is completed, at which time the operating system controls the operation of the computer system. In step 525, the operating system dispatches code which operates to place the computer system in an environmental monitoring mode wherein the system processor 402 is receptive to interrupts from the environmental controller 442. These interrupts may indicate conditions requiring action by the system processor such as the occurrence of an overheating condition requiring that the system processor shut down a computer system component or components.

Figure 6:
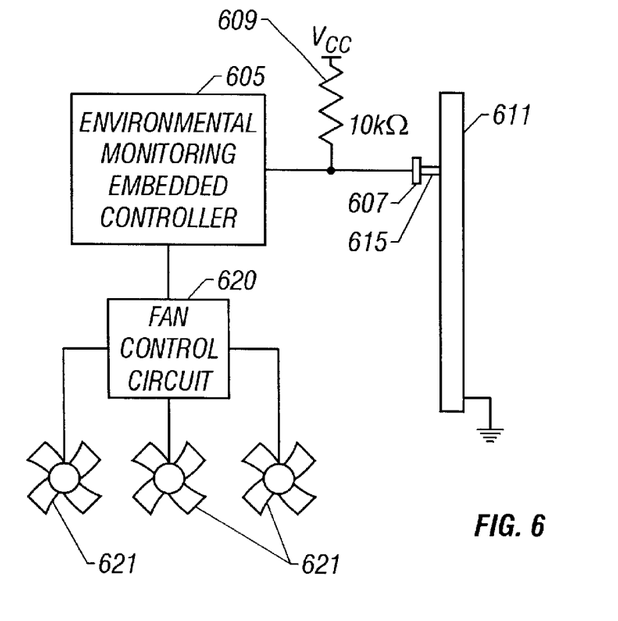
FIG. 6 is a diagram showing one embodiment of a chassis detection circuit according to the present invention.

FIG. 6 is a diagram showing one embodiment of a chassis detection system according to the present invention. In FIG. 6, the determination of chassis type and/or computer system type is independent of the operation of the system processor during startup. The computer system of FIG. 6 includes an embedded controller 605 for monitoring and controlling the environmental conditions of the computer system. In one embodiment, the environmental controller 605 is an 8-bit controller offered under the trade designation of H8/2337 by the HITACHI Corp. Embedded controller 605 has an input terminal electrically connected to an electrically conductive surface 607 (similar to item 420) and to one end of a 10K ohm pull up resistor 609. The electrically conductive surface 607 is physically coupled to the a system printed circuit board of the computer system. Planar plate 611 is of a first type in that it has a corresponding grounded structure 615 (like hook 220) which is in electrical contact with the electrically conductive surface 607 when the printed circuit board is secured to the planar plate 611. In FIG. 6, the voltage level of the electrically conductive structure 607 and consequently, the voltage level of the input terminal of the embedded controller 605 is at ground. In FIG. 6, the embedded controller 605 is able to determine the planar plate type and/or computer system chassis type via the voltage level of its input terminal electrically connected to the electrically conductive surface 607.

The embedded controller 605 also includes other input terminals (not shown) for monitoring the environmental conditions of the computer system chassis such as the air temperature inside the chassis and whether the fans 621 are operating. The embedded controller 605 controls the operation of fans 621 via the fan control circuit 620. Fans 621 are mounted to the computer system chassis and bring cooler outside air into the computer system chassis during their operation. In some embodiments, the embedded controller 605 controls the speed of each fan 621 or individually controls whether each fan 621 is operating. In some embodiments, the embedded controller 605 is capable of individually controlling the speed of each fan 621. The embedded controller monitors and controls the temperature within the computer system chassis via an environmental program stored in a memory internal to the embedded controller 605. The chassis type as determined by the voltage level of the electrically conductive surface 607 is one input variable for the environmental control program. The measured temperature inside the computer system chassis is another input variable. In one embodiment, the embedded controller 605 is operably coupled to the system processor such that embedded controller 605 is capable of generating an interrupt to the system processor in the event of a condition requiring the shut down of some of the components of the computer system such as when all of the fans 621 are inoperable. In such a condition, continued operation of the computer system would damage the components.

In some embodiments, the memory internal to the embedded controller 605 stores a plurality of environmental programs; wherein the embedded controller 605 selects one of the programs based upon the computer system chassis type that is determined via its input terminal electrically connected to the electrically conductive surface 607.

In some embodiments, the circuit of FIG. 6 is located within a chassis that houses other types of electronic devices.

In some embodiments, the electrically conductive surface (such as item 420 or item 607) may be connected to both an embedded controller (similar to 605) and the I/O register (similar 413) wherein the presence of the corresponding structure of the planar plate is read by both the embedded processor 605 and the system processor 402.

In some embodiments, the chassis detection circuit may be used to detect the presence of a structure on other portions of the chassis. For example, each chassis type may include a different type of back plate wherein the chassis detection circuit provides a signal indicative of the presence of a structure on the back plate which is indicative of chassis type. Also in other embodiments, the structure of the chassis that is detected may have other forms such as a spring finger structure extending from a chassis plate or a screw or clip that electrically couples a portion of the chassis to the electrically conductive surface. In these embodiments, the chassis detection circuit would detect the presence of the screw or clip. Also in other embodiments, the printed circuit board may be secured to other types of chassis structures wherein the chassis detection circuit would detect differences in those chassis structures.

In other embodiments, the chassis detection circuit detects the presence of more than one structure of the chassis wherein each structure is indicative of the chassis type. Referring back to FIG. 1, with a multiple structure detection system, the circuit board would include a plurality of clips (similar to clip 131) and associated pull up resistors (similar to resistor 130) with each clip-pull up resistor set electrically connected to an input terminal of the I/O register. Having a plurality of clip-pull up resistor sets allows a computer system to differentiate among more than two chassis types. For example, a system that includes two clip-pull up resistor sets would be able to differentiate among up to four different chassis types. The first type of chassis would have a first and a second grounded structures present, the second type of chassis would have only the first grounded structure present, the third type of chassis would have only the second grounded structure present, and a fourth type of chassis would have neither the first nor second grounded structures present. The output of the I/O register would indicate in which of the four chassis types the circuit board is installed.

In other embodiments, the voltage potential of the structures of the chassis that are detected by the chassis detection circuit may be at different voltage potentials other than ground. Thus, electrical contact by an electrically conductive surface (similar to item 420) to a structure of the chassis would pull the voltage level of the electrically conductive surface to the voltage level of the chassis.

While particular embodiments of the present invention have been shown and described, it will be obvious to those skilled in the art that changes and modifications may be made without departing from this invention and its broader aspects and, therefore, the appended claims are to encompass within their scope all such changes and modifications as are within the true spirit and scope of this invention.

What is claimed is:

1. An apparatus for determining chassis type:
a first surface;
a chassis detection circuit providing a type signal indicative of the presence of a structure of the chassis contacting the first surface;
wherein the presence of the structure is indicative of chassis type.

2. The apparatus of claim 1 wherein:
the first surface is electrically conductive;
the type signal is indicative of an electrically conductive structure of the chassis electrically contacting the first surface.

3. The apparatus of claim 1 wherein:
the chassis includes a planar plate;
the type signal is indicative of a structure of the planar plate contacting the first surface.

4. The apparatus of claim 1 further comprising:
a clip, the first surface located on the clip.

5. The apparatus of claim 1 further comprising:
a second surface;
wherein the chassis detection circuit provides a second type signal indicative of the presence of a second structure of the chassis contacting the second surface;
wherein the presence of the second structure is indicative of chassis type.

6. The apparatus of claim 2 wherein:
the chassis detection circuit includes a pull up resistor having a first end and a second end;
the second end is electrically coupled to the electrically conductive first surface;
the type signal is dependent upon the voltage level of the second end.

7. The apparatus of claim 2 wherein:
the type signal is indicative of a grounded structure of the chassis electrically contacting the electrically conductive first surface.

8. The apparatus of claim 2 wherein the type signal is dependent upon the voltage level of the electrically conductive surface.

9. A computer system comprising:
a circuit board;
a system processor;
a chassis, the chassis being of a chassis type, the circuit board and the system processor are located within the chassis;
a chassis detection circuit providing a type signal indicative of the presence of a structure of the chassis; and
wherein the presence of the structure is indicative of the chassis type;
wherein the type signal is indicative of the chassis type.

10. The computer system of claim 9 wherein:
the computer system being of a computer system type;
the presence of the structure is indicative of the computer system type;
the type signal is indicative of the computer system type.

11. The computer system of claim 9 further comprising:
a surface physically coupled to the circuit board;
wherein the type signal is indicative of whether a structure of the chassis is contacting the surface.

12. The computer system of claim 9 wherein the structure of the chassis is a hook.

13. The computer system of claim 9 wherein:
the chassis includes a planar plate, the circuit board is secured to the planar plate, the system processor is physically coupled to the circuit board;
the type signal is indicative of the presence of a structure of the planar plate.

14. The computer system of claim 9 wherein the system processor receives the type signal.

15. The computer system of claim 9 further comprising:
a microcontroller receiving the type signal from the chassis detection circuit.

16. The computer system of claim 9 wherein:

the surface is electrically conductive;

the chassis detection circuit further includes an I/O register circuit having an input electrically coupled to the electrically conductive surface, the I/O circuit having an output, the state of the output indicative of the presence of a grounded structure of the chassis electrically contacting the electrically conductive surface;

the state of the output is determined during the start up of the computer system.

17. The computer system of claim 11 wherein:

the surface is electrically conducting;

the type signal is indicative of whether an electrically conductive structure of the chassis is electrically contacting the electrically conductive surface.

18. The computer system of claim 11 further comprising:

a clip attached to the circuit board, the surface located on the clip.

19. The computer system of claim 14 wherein the chassis detection circuit includes an addressable logic circuit, the system processor receives the type signal by reading the addressable logic circuit.

20. The computer system of claim 14 further comprising:

a user interface;

wherein:

the computer system is of a computer system type;

the presence of the structure is indicative of the computer system type;

the type signal is indicative of the computer system type;

the processor initiates the display of an indication of the computer system type on the user interface as indicated by the type signal.

21. The computer system of claim 14 further comprising:

a user interface;

wherein:

the presence of the structure is indicative of the chassis type;

the type signal is indicative of the chassis type;

the processor initiates the display of an indication of the chassis type on the user interface as indicated by the type signal.

22. The computer system of claim 15 wherein:

the microcontroller is an embedded microcontroller having an input for receiving the type signal.

23. The computer system of claim 17 wherein the type signal is indicative of whether a grounded structure of the chassis is electrically contacting the electrically conductive surface.

24. The computer system of claim 17 wherein:

the chassis detection circuit includes a pull up resistor having a first end electrically coupled to a voltage source and a second end electrically coupled to the electrically conductive surface;

the type signal is dependent upon the voltage level of the second end.

25. A method for determining the chassis type of an electronic device comprising:

detecting the presence of a structure of a chassis for an electronic device, the presence of a structure of the chassis indicative of the chassis type;

providing a type signal indicative of the presence of the structure.

26. The method of claim 25 wherein the detecting includes detecting the presence of an electrically grounded structure of the chassis.

27. The method of claim 25 wherein detecting includes detecting whether a structure of a chassis is contacting a surface.

28. The method of claim 25 wherein detecting includes detecting whether an electrically grounded structure of a chassis is electrically grounding a surface.

29. The method of claim 25 further comprising:

displaying on a user interface the chassis type as indicated by the type signal.

30. The method claim 25 further comprising:

providing the type signal to a processor.

31. The method of claim 25 further comprising:

reading the type signal;

executing a processor operation based upon the information conveyed by the type signal.

32. The method of claim 31 wherein the reading the type signal is performed during a basic input output system (BIOS) routine.

33. The method of claim 31 wherein:

the executing a processor operation includes:

selecting a particular program from a plurality of chassis environmental programs; and executing the particular program;

wherein the selection of the one program from the plurality is based upon the information conveyed by the type signal.

34. A computer system comprising:

a circuit board;

a system processor;

a chassis, the chassis being of a chassis type, the circuit board and the system processor are located within the chassis;

an electrically conductive surface physically coupled to the circuit board;

a chassis detection circuit including a pull up resistor having a first end electrically coupled to the electrically conductive surface;

wherein the chassis detection circuit provides a type signal dependent upon the voltage level of the first end of the pull up resistor, the type signal is indicative of the presence of a grounded structure of the chassis electrically contacting the electrically conductive surface, wherein the presence of the structure is indicative of the chassis type.

35. The computer system of claim 34 wherein:

the chassis includes a planar plate, the circuit board secured to the planar plate;

the type signal is indicative of the presence of a grounded structure of the planar plate electrically contacting the electrically conductive surface.

36. A computer system comprising:

a circuit board;

a system processor;

a chassis, the circuit board and the system processor are located within the chassis;

means for detecting structural differences of the chassis and providing a signal indicative thereof.

* * * * *